(12) United States Patent
Herz et al.

(10) Patent No.: US 8,874,148 B2
(45) Date of Patent: Oct. 28, 2014

(54) AUTOMATIC CONTACT RECOGNITION FROM SMS

(75) Inventors: Scott Herz, Santa Clara, CA (US); Marcel Van Os, San Francisco, CA (US)

(73) Assignee: Apple Inc., Cupertino, CA (US)

(*) Notice: Subject to any disclaimer, the term of this patent is extended or adjusted under 35 U.S.C. 154(b) by 1284 days.

(21) Appl. No.: 12/207,278

(22) Filed: Sep. 9, 2008

(65) Prior Publication Data

US 2009/0305730 A1  Dec. 10, 2009

(51) Int. Cl.
  *H04W 4/12* (2009.01)
  *H04W 4/14* (2009.01)
  *G06F 17/21* (2006.01)
  *G06F 17/27* (2006.01)
  *H04L 12/58* (2006.01)

(52) U.S. Cl.
  CPC .......... *H04L 12/5895* (2013.01); *H04L 12/5835* (2013.01); *H04L 51/38* (2013.01); *H04L 51/066* (2013.01)
  USPC .......................................... 455/466; 715/234

(58) Field of Classification Search
  CPC  G06F 17/2247; H04H 2201/13; H04L 69/22; H04M 1/274508; H04M 1/72519; H04M 1/72522; H04M 1/72552; H04W 4/14; H04W 88/02; H04W 8/18; H04W 8/22
  USPC ................................................... 455/466, 566
  See application file for complete search history.

(56) References Cited

U.S. PATENT DOCUMENTS

| | | | |
|---|---|---|---|
| 6,049,796 A * | 4/2000 | Siitonen et al. | 707/711 |
| 6,175,741 B1 * | 1/2001 | Alperovich | 455/458 |
| 6,188,909 B1 * | 2/2001 | Alanara et al. | 455/466 |
| 6,370,389 B1 * | 4/2002 | Isomursu et al. | 455/466 |
| 6,377,928 B1 * | 4/2002 | Saxena et al. | 704/275 |
| 6,966,029 B1 * | 11/2005 | Ahern | 715/234 |
| 7,756,860 B2 * | 7/2010 | Hamilton et al. | 707/718 |
| 7,864,714 B2 * | 1/2011 | Tracey | 370/260 |
| 2002/0165630 A1 * | 11/2002 | Arthur et al. | 700/91 |
| 2004/0165791 A1 * | 8/2004 | Kaltanji | 382/305 |
| 2004/0249797 A1 * | 12/2004 | Jarvinen et al. | 707/3 |
| 2006/0058063 A1 * | 3/2006 | Bocking et al. | 455/556.2 |
| 2007/0238487 A1 * | 10/2007 | Kuhl et al. | 455/566 |
| 2007/0248055 A1 * | 10/2007 | Jain et al. | 370/331 |
| 2008/0161058 A1 * | 7/2008 | Park et al. | 455/564 |
| 2009/0305730 A1 * | 12/2009 | Herz et al. | 455/466 |

\* cited by examiner

*Primary Examiner* — Matthew Sams
(74) *Attorney, Agent, or Firm* — Blakely, Sokoloff, Taylor & Zafman LLP

(57) ABSTRACT

A first mobile device receives an input to send data via a text messaging protocol to a second mobile device. The data is marked up with one or more transparent text message characters to delimit fields in the data. The marked up data is transmitted via the text messaging protocol to the second mobile device.

34 Claims, 9 Drawing Sheets

Here's the contact info for:

Danny Larusso ----\n   ———— Pattern 510

Home--818-389-9382 ---\n
Pattern 540                 Pattern 520

Work: 818-389-1252---\n

Home--8050 Oasis Drive--\n

--Reseda, CA 91335--\n

Email -- kkid84@miyagi.com ----\n

Pattern 530

Mobile Device UI 400

BEGIN: VCARD VERSION: X.1
N: Larusso; Danny
FN: Danny Larusso
TEL; type=HOME: 818-389-9382
TEL; type=WORK: 818-389-1252
item1.ADR;type=HOME;type=pref:
;;8050 Oasis Avenue;Reseda;CA;
91335;USA
EMAIL; type=INTERNET:
kkid84@miyagi.com

Fig. 4A

Mobile Device UI 400

Here's the contact info for:
Danny Larusso
Home   818-389-9382
Work   818-389-1252
Home   8050 Oasis Drive
       Reseda, CA 91335
Email   kkid84@miyagi.com

Fig. 4B

Here's the contact info for:

Danny Larusso----\n — Pattern 510

Home--818-389-9382---\n — Pattern 520

Pattern 540 — Work--818-389-1252---\n

Home--8050 Oasis Drive--\n

--Reseda, CA 91335--\n

Email -- kkid84@miyagi.com----\n

Pattern 530

Fig. 5

AUTOMATIC CONTACT RECOGNITION FROM SMS

This Non-provisional application claims priority to U.S. Provisional Application No. 61/059,641, entitled Automatic Contact Recognition from SMS, filed on Jun. 6, 2008.

FIELD

Embodiments of the invention relate to text messaging, and more particularly to sending and receiving of contact information via text message protocols.

BACKGROUND

The mobile device is becoming increasingly ubiquitous as a communication tool. In addition to its use as a cell phone, the mobile device is often used for other forms of communication including email, text messaging and the like. Text message services and protocols (e.g., Short Message Service (SMS)) are primarily designed to handle simple short messages of text. Depending on the protocol(s) used, text messages are limited to a single text message size of either 160 7-bit characters, 140 8-bit characters, or 70 16-bit characters.

A markup language is a set of annotations (or markups) to text that describes how the text is to be structured, laid out, parsed or formatted. It is common in many markup languages to have the text of a document intermingled with markup instructions in the same data stream or file. These embedded or "inline" markups can be processed by various applications, services and/or programs designed with such capability.

However, applications, services and/or programs without such capability are often forced to present the intended text along with the inline markups via a user interface. Such presentation can it make it difficult, confusing and/or aesthetically unpleasant for a user to view. For example, electronic business cards are typically marked up according to a particular file format (e.g., vCard). Conventional text messaging services are not capable of recognizing the markups associated with an electronic business card. As such, attempts to send an electronic business card as a text message will result in a receiving user being presented with a garbled mixture of contact information and inline markups.

SUMMARY OF THE INVENTION

A first mobile device receives an input to send data via a text messaging protocol to a second mobile device. For example, a mobile device user may desire to send contact information (e.g., an electronic contact/business card) via SMS. The data is marked up with one or more transparent text message characters to delimit fields in the data. The marked up data is transmitted via the text messaging protocol to the second mobile device. If the second mobile device is capable, it will recognize the transparent field delimiters in the received text message and automatically convert the data (e.g., into an electronic contact/business card). If the second mobile device does not have this recognition capability, the contact information in the text message will be presented in a clean, clear and readable format.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIGS. 4A-B are block diagrams illustrating text displays on a user interface.

FIG. 5 is a diagram illustrating various text message character patterns used in various embodiments.

DETAILED DESCRIPTION

Figure 1:
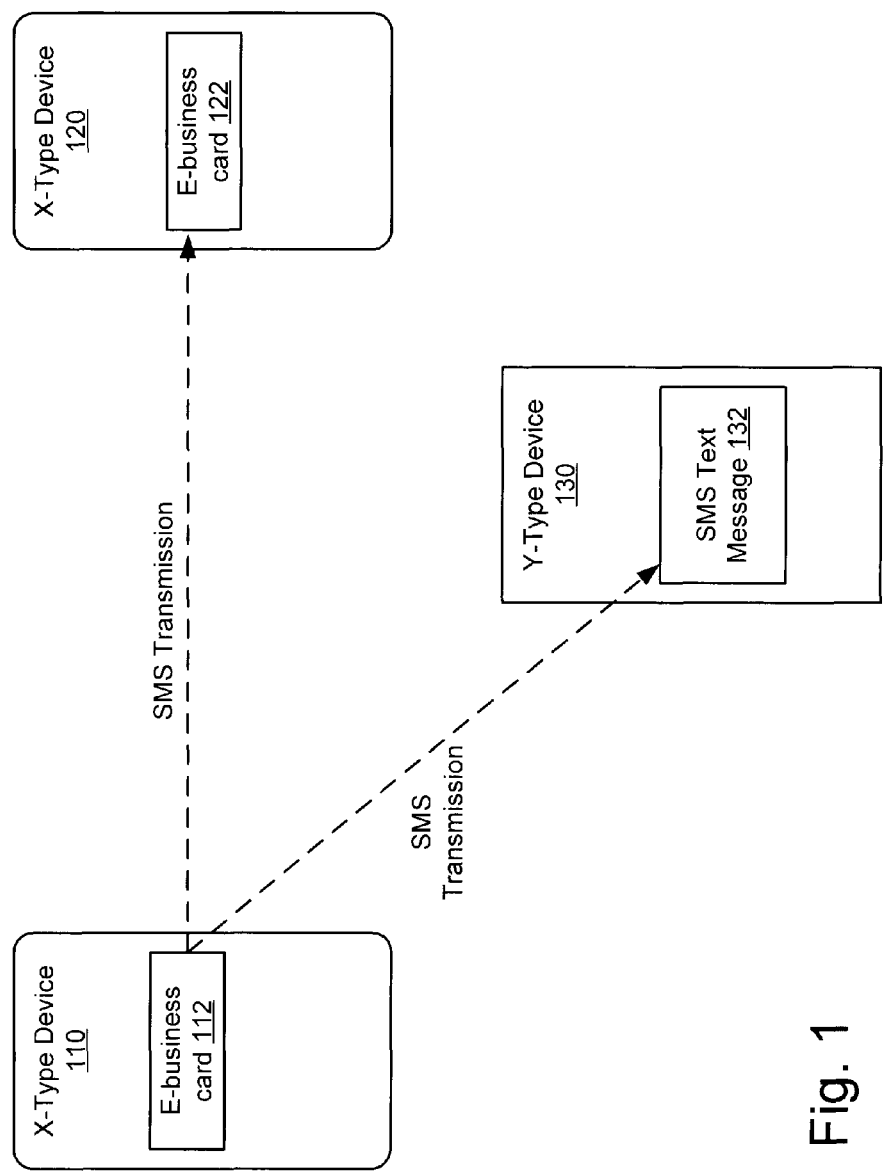
FIG. 1 is a block diagram illustrating transmission of contact information to different devices according to various embodiments.

Embodiments described herein facilitate the sending of structured data, such as electronic business cards, via text messaging protocols. When a mobile device capable of processing electronic business cards via text messaging protocols recognizes certain character patterns in a text message, the mobile device automatically parses the data from the text message into an electronic business card. As used herein, an electronic business card may refer to any compilation or combination of personal and/or contact information including, but not limited to, phone numbers, addresses, website links, fax numbers, dates (e.g., birthdays, anniversaries, etc.), photographs, maps and the like. Mobile devices that are not equipped to process electronic business cards sent via a text messaging protocol can still receive and view the personal/contact information via text message in various embodiments.

In various embodiments, text messages are marked up with transparent text message characters. Conventional text messages are created using characters of a particular character set. For example, SMS text messages may use Unicode character encoding or Global System for Mobile communications version 7 (GSM7) character encoding. Other encoding schemes known in the art could also be used. As used herein, transparent text message characters may be text message characters that are not visible or otherwise not highly noticeable to the human eye. For example, in the Unicode character set, the space and the non-breaking space characters are essentially invisible to the human eye and could be referred to as transparent text message characters. Additionally, characters such as a carriage return, newline and the like could also be transparent text message characters in various embodiments. In contrast, characters such as "@," "#," "&", and ">" are easily noticed on a display screen and would not be considered transparent text message characters. A character such as the underscore character ("_") is not entirely invisible but is also not highly noticeable and/or visually distracting and could be considered a transparent text message character in some embodiments.

Electronic business cards may be transmitted via text messaging protocols by marking up a text message with transparent text message characters. Patterns and/or strings of transparent text message characters are used to delimit various fields of an electronic business card in a text message. For example, a string of three consecutive space characters followed by a carriage return might separate the "name" field from the "address" field of an electronic business card. Of course, other specific patterns could be used to delimit these fields as well. In some embodiments, different instances of the same pattern of transparent text message characters can signify different field delimiters. For example, the first instance of a string of three consecutive space characters could delimit a "phone number" field while the second instance of a string of three consecutive space characters could delimit an "email address" field.

A mobile device equipped to recognize transparent text message character patterns as field delimiters as described above can receive a text message and automatically convert the data from the text message into an electronic business card and present it on a display for the user of the mobile device. However, mobile devices that are not equipped to recognize patterns and convert text messages into electronic business cards can still display the information associated with the electronic business card in a user-friendly format. Given the use of transparent text message characters to markup the text message, the markups are essentially invisible to users of mobile devices not capable of recognizing the markups and converting text messages to electronic business cards. Thus, rather than viewing a garbled text message where the contact information may or may not be discernable amid the markups, the user can view a "clean" text message showing the contact information in the electronic business card.

FIG. 1 is a block diagram illustrating transmission of contact information to different devices according to various embodiments. X-type device 110 contains data including electronic business card 112. As shown, X-type device 110 can send a copy of electronic business card 112 via Short Message Service (SMS) transmission to X-type device 120 and Y-type device 130. In various embodiments, X-type devices, as shown in FIG. 1, could be, for example, iPhones from Apple Inc. of Cupertino, Calif. However, the term X-type device is intended to represent any mobile device capable of sending, recognizing and converting an electronic business card from an SMS transmission according to embodiments described herein. In other words, X-type devices can be different products from different manufacturers. In contrast, a Y-type device (e.g., Y-type device 130) is intended to represent any mobile device that is not equipped to send, recognize and convert an electronic business card from an SMS transmission according to embodiments described herein. Though various embodiments described herein discuss the use of SMS text messages, any protocol or service that sends clear text messages could also be used in different embodiments (e.g., email clients, social networking sites and micro-blogging sites such as Twitter, comment sections in blogs and other forums, etc.) When an X-type device (e.g., X-type device 120) receives a text message that includes an electronic business card, it may be automatically converted into electronic business card 122. In some embodiments, the text message may only be converted after receiving user input requesting the conversion. Data (e.g., contact information, etc.) associated with the electronic business card may constitute the whole text message or merely part of the text message.

Figure 2:
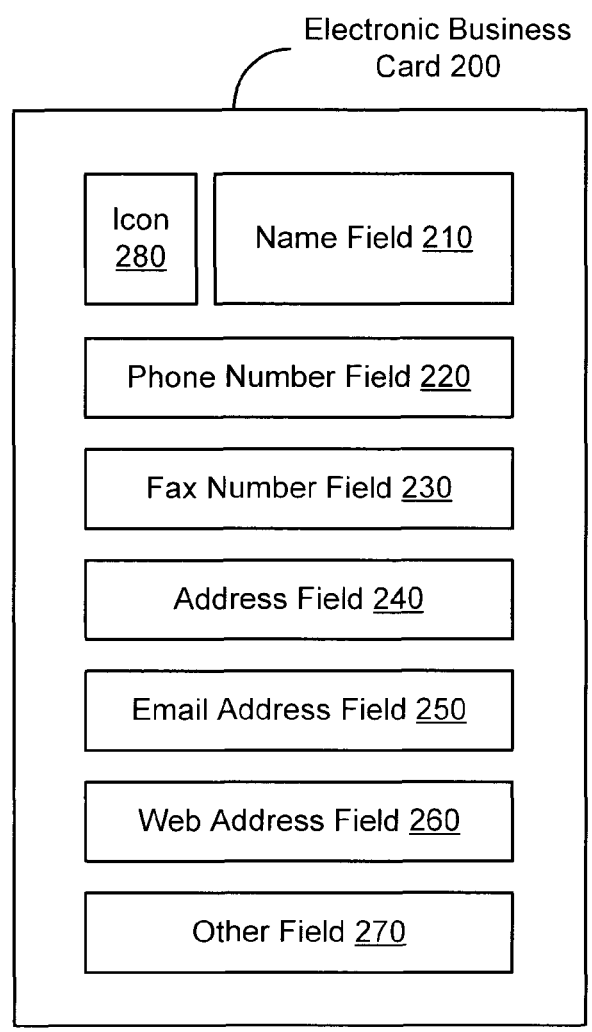
FIG. 2 is a block diagram illustrating an electronic contact card used in various embodiments.

FIG. 2 is a block diagram illustrating an electronic business card used in various embodiments. Electronic business card 200 contains several fields including name field 210, phone number field 220, fax number field 230, address field 240, email address field 250, web address field 260, other fields 270 and icon 280. The order, appearance, layout, etc. of the fields can be different in different embodiments. Additionally, one of skill in the art will appreciate that the fields shown in FIG. 2 are not exhaustive. Other fields could be added, including sub-fields (e.g., "first name" field and "last name" field, "work address" field and "home address" field, etc.). Icon 280 could be an image such as a photograph, drawing, map, etc. Some embodiments could include multiple icons.

Figure 3:
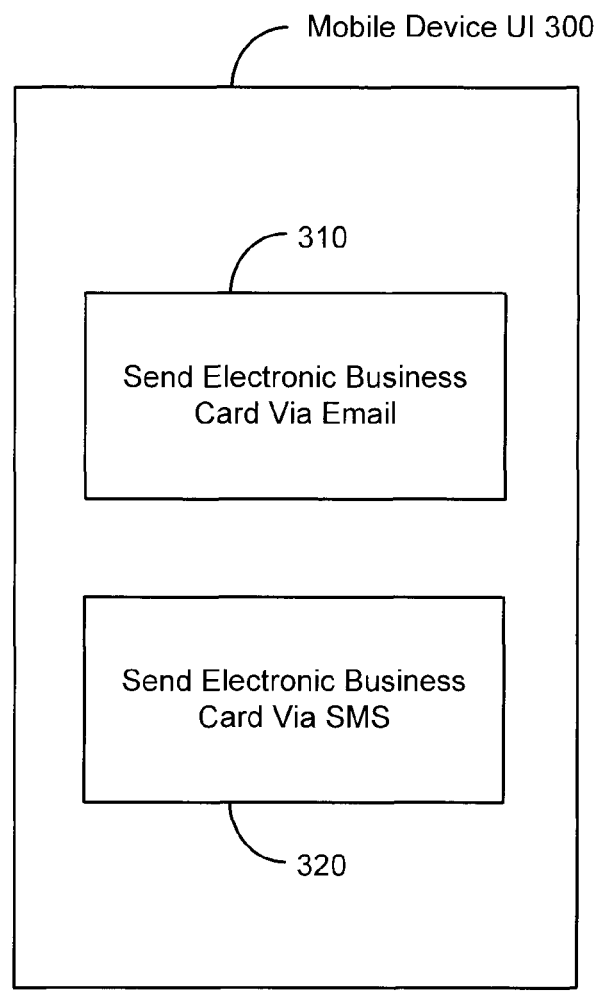
FIG. 3 is a block diagram illustrating a mobile device user interface.

FIG. 3 is a block diagram illustrating a mobile device user interface. In some embodiments, when an a user of an X-type device desires to send an electronic business card to another user, the user may be presented with a user interface 300 that gives the user the option to send the electronic business card via email 310 or via SMS transmission 320. In other embodiments, an X-type device might automatically select whether to send the electronic business card via email or SMS, for example, based on the recipient's contact information. For example, if the recipient's contact information includes an email address, the device might send the electronic business card via email; whereas if the recipient's contact information only includes a phone number, the electronic business card might be sent via SMS. In some embodiments, electronic business cards could be sent via email and SMS simultaneously.

FIGS. 4A-B are block diagrams illustrating text displays on a user interface. FIG. 4A is intended to illustrate an example of how an electronic business card sent as a text message from a Y-type device might appear on a display of another Y-type device. Given that conventional methods and devices (e.g., Y-type devices) are not configured and/or equipped to markup and send an electronic business card with transparent text message characters, the appearance, as shown in FIG. 4A, is garbled and/or confusing. In other words, the contact information is obfuscated, at least in part, by the markups.

Contrast FIG. 4A with FIG. 4B. FIG. 4B is intended to illustrate an example of how an electronic business card sent as a text message from an X-type device might appear on a display of a Y-type device. Given that various embodiments of an X-type device are capable of marking up a text message with transparent text message characters, the recipient Y-type device display will show the contact information from the electronic business card in a relatively clear and organized fashion, as shown in FIG. 4B. The example in FIG. 4B can be modified in other embodiments; the exact layout of the contact information is not as important as the overall clear and concise appearance.

FIG. 5 illustrates in more detail the markup patterns associated with the text message display of FIG. 4B. As discussed herein, markups for electronic business cards sent via text messages in various embodiments employ transparent text message characters in various patterns. The "\n" symbol used in FIG. 5 is intended to provide a visual example of a return character, such as a newline or carriage return. The dash characters (e.g., " - - - ") used in FIG. 5 are intended to provide a visual example of space characters (e.g., space, non-breaking space, etc.) given that space characters themselves are not visible on a display screen. In some embodiments, the dash characters of FIG. 5 could in fact be dash characters, underscore characters, or other characters that could be considered transparent despite not being absolutely invisible on a display screen.

Various transparent text message patterns signify field delimiters in various embodiments. For example, pattern 510 indicates a delimiter for the "name" field in FIG. 5. Pattern 510 could delimit a different field in other embodiments.

Pattern 520, as shown, delimits the "home phone number" field. Pattern 540 is shown separating the "work phone number" field from the number itself. In general, any pattern can be used to signify and/or delimit any field associated with the electronic business card. Repeated instances of the same pattern can also be used to distinguish different fields in some embodiments. For example, pattern 530 is the same as pattern 510. Pattern 530 may be referred to as the second instance of the pattern while pattern 510 would be considered the first instance of the pattern. Thus, the first instance of a pattern can signify one delimiter while a second instance of the same pattern can signify a different delimiter in various embodiments.

Figure 6A:
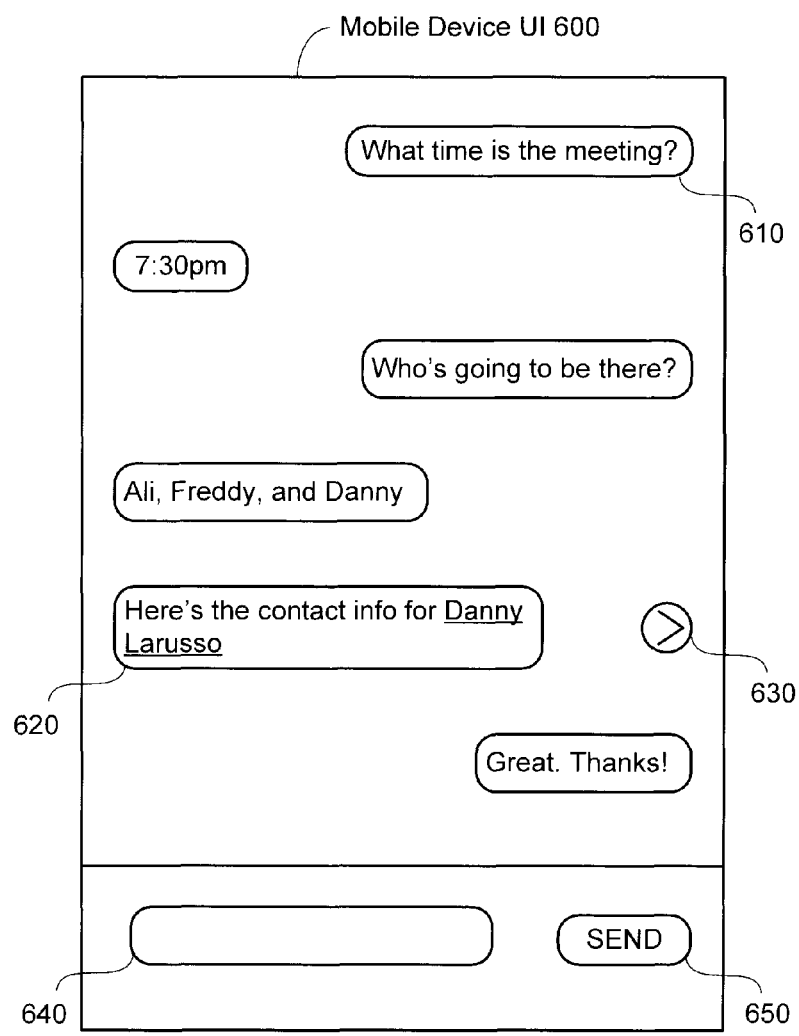
FIGS. 6A-B are diagrams illustrating the display of text messages according to various embodiments.
Figure 6B:
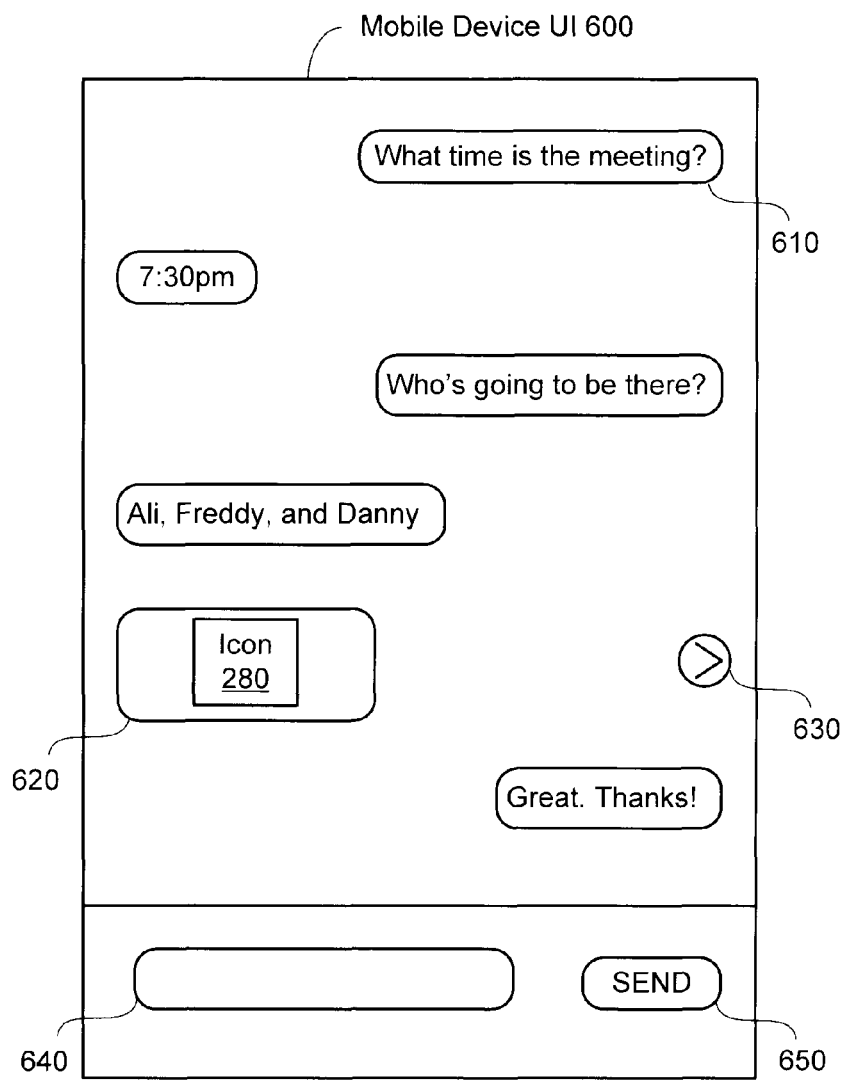

FIGS. 6A-B are diagrams illustrating the display of text messages according to various embodiments. FIG. 6A shows a user interface 600 for a mobile device. The various bubbles track an ongoing text message conversation between two users. It is not necessary to display the ongoing conversation—the conversation could be displayed one piece at a time on user interface 600. In X-type devices (e.g., devices that are capable of recognizing and converting electronic business cards from marked up text messages), a piece of contact information (e.g., a name) can be underlined or otherwise accentuated (e.g., highlighting, italicizing, etc.) on the user interface to indicate that the received message includes an electronic business card. For example, in bubble 620, the name Danny Larusso is underlined, indicating that Danny's electronic business card is part of the message.

In various embodiments, the underlined or accentuated portion of the user interface can be tapped, touched, or otherwise selected to display the electronic business card (e.g., the electronic business card display of FIG. 2). In other embodiments, an icon (e.g., chevron 630) could be tapped, touched, or otherwise selected to display the electronic business card. The tapping, touching or selecting may cause the electronic business card to be saved to the device in addition to displaying the electronic business card.

FIG. 6B illustrates another example for presenting an electronic business card in a bubble or on a user interface of an X-type device. Bubble 620 in FIG. 6B could simply show an icon (e.g., icon 280 of FIG. 2) associated with the electronic business card to accentuate the bubble, indicating the presence of the electronic business card. Again, by tapping, touching or otherwise selecting the icon, the electronic business card may be displayed and/or saved on the device. In various embodiments, including those illustrated in FIGS. 6A and 6B, selecting an electronic business card could cause all or part of the electronic business card to be displayed and/or stored.

Figure 7A:
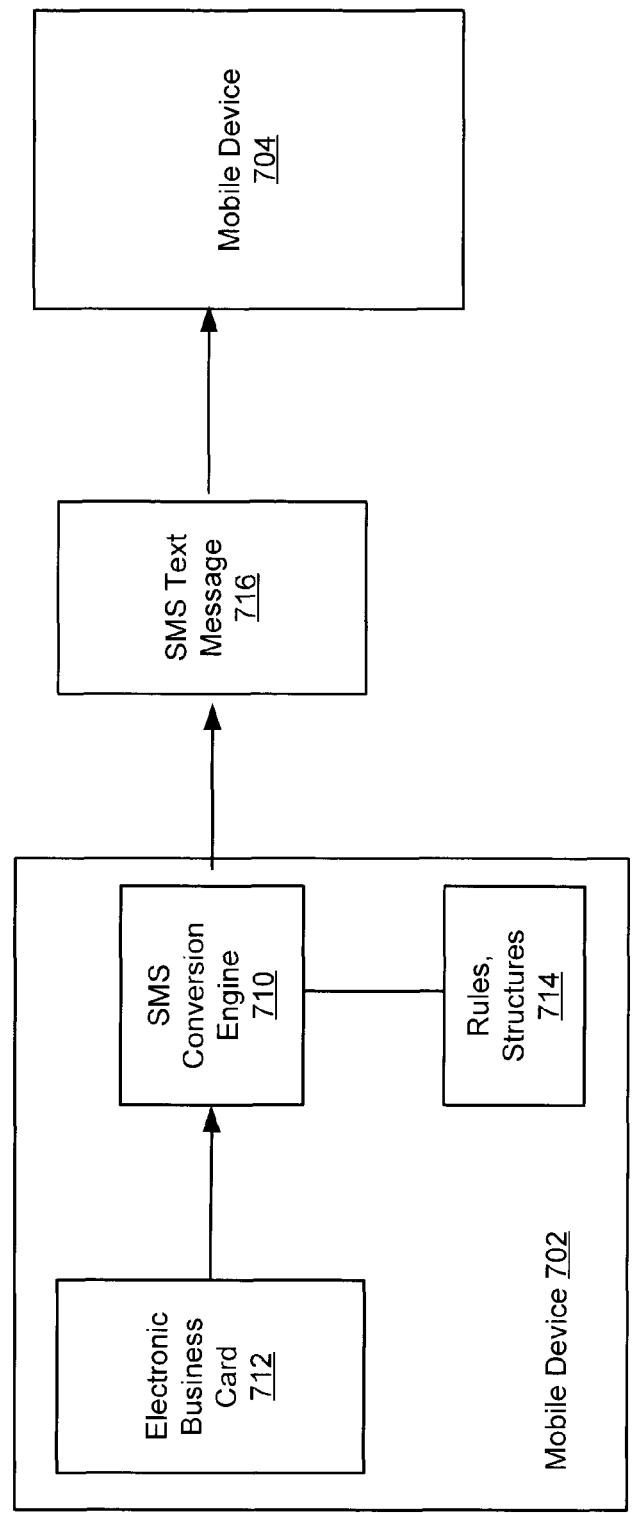
FIGS. 7A-B are block diagrams illustrating various components of a mobile device used in various embodiments.

FIG. 7A is a block diagram illustrating various components of a mobile device used in various embodiments. Mobile device 702 includes storage for one or more electronic business cards 712. An SMS conversion engine 710 parses the electronic business card into various fields and marks up the fields using transparent text message characters based on various rules and structures 714. The markups include various patterns, such as those illustrated and described in FIG. 5.

The marked up electronic business card is then sent as an SMS text message 716 to mobile device 704. If mobile device 704 is not equipped to recognize and convert SMS text message 716 back into an electronic business card, mobile device 704 can simply display the contact information associated with the electronic business card. Given that the text message is marked up with transparent text message characters, the contact information will be displayed in a relatively clear and organized manner, as described previously herein.

Figure 7B:
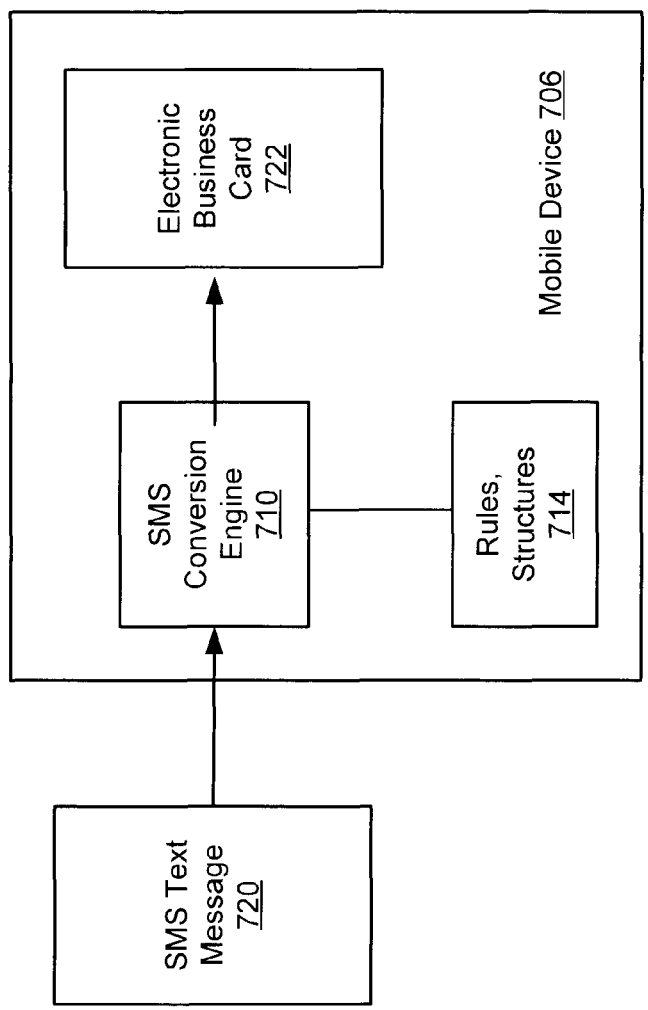

FIG. 7B is a block diagram illustrating further details of a mobile device capable of receiving and converting an electronic business card from an SMS text message. When a text message 720 is received by mobile device 706 (sent, for example, from mobile device 702 of FIG. 7A), SMS conversion engine 710 recognizes various patterns in the text message. The patterns in the text message are formed from transparent text message characters. Given the patterns and based on various rules and structures 714, SMS conversion engine 710 parses text message 720 into various fields and converts the information in those fields into an electronic business card 722. The entire text message can be converted to an electronic business card or only a relevant portion of text message 720 may be converted in some embodiments.

Various components described herein may be a means for performing the functions described herein. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a computer readable medium, which provides content that represents instructions that can be executed. The content may result in a computer performing various functions/operations described herein. A computer readable medium includes any mechanism that provides (i.e., stores and/or transmits) information in a form accessible by a computing device (e.g., computer, PDA, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or the like. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method, comprising:
    receiving at a first mobile device an indication to send data having an electronic business card via a text messaging protocol to a second mobile device;
    detecting the electronic business card;
    marking up the data to create marked up data by (1) adding at least three different length patterns of at least three different combinations of two or more transparent text message characters to delimit at least three different types of data fields in the data, the fields associated with the electronic business card, wherein at least two of the two or more transparent text message characters are different characters;
    and (2) using a first instance of a first length pattern of a first two or more transparent text message characters to distinguish a first type of a data field; then using a second instance of the first length pattern of the first two or more transparent text message characters to distinguish a second type of a data field; and transmitting the marked up data via the text messaging protocol to the second mobile device.

2. The method of claim 1, wherein the data comprises contact information.

3. The method of claim 2, wherein the contact information comprises data selected from the group consisting of address data, phone number data, fax number data, email address data, name data, employer data, or web address data.

4. The method of claim 1, wherein the transparent characters are one of Unicode characters or Global System for Mobile communications (GSM) characters.

5. The method of claim 1, wherein the two or more transparent characters include (1) a space character or a non-breaking space character, and (2) a carriage return character or a new line character.

6. The method of claim 1, wherein the text messaging protocol is Short Message Service (SMS).

7. The method of claim 1, wherein a first instance of a pattern of one or more transparent characters constitutes a first field delimiter and a second instance of the pattern of one or more transparent characters constitutes a second field delimiter.

8. The method of claim 1, wherein marking up comprises parsing the electronic business card into a plurality of fields and adding the transparent text message characters between pairs of fields.

9. The method of claim 8, wherein the transparent characters are selected from the group consisting of space characters, non-breaking space characters, carriage returns, and newlines.

10. The method of claim 1, wherein the two or more transparent text message characters, one of (1) comprise a space character or a non-breaking space character followed by a carriage return, (2) are three space characters or non-breaking space characters followed by a carriage return, or (3) are three space characters or non-breaking space characters.

11. The method of claim 1, wherein the two or more transparent text message characters comprise recognizable character patterns that signify 3 or more different types of data fields.

12. An article of manufacture, comprising a non-transitory computer readable medium having content stored thereon to provide instructions to result in an electronic device performing operations including:

receiving at a first mobile device an indication to send data via a text messaging protocol to a second mobile device, wherein the data includes a plurality of fields from an electronic business card;

detecting the plurality of fields;

marking up the data to create marked up data (1) with at least three different length patterns of at least three different combinations of two or more transparent text message characters to delimit at least three different types of data fields of the plurality of fields in the data, wherein at least two of the two or more transparent text message characters are different characters;

and (2) using a first instance of a first length pattern of a first two or more transparent text message characters to distinguish a first type of a data field; then using a second instance of the first length pattern of the first two or more transparent text message characters to distinguish a second type of a data field; and transmitting the marked up data via the text messaging protocol to the second mobile device.

13. The article of manufacture of claim 12, wherein the text messaging protocol includes business card file format having the plurality of fields and the data comprises contact information.

14. The article of manufacture of claim 13, wherein the contact information comprises data selected from the group consisting of address data, phone number data, fax number data, email address data, name data, employer data, or web address data.

15. The article of manufacture of claim 12, wherein the transparent characters are one of Unicode characters or Global System for Mobile communications (GSM) characters.

16. The article of manufacture of claim 12, wherein the two or more transparent characters include (1) a space character or a non-breaking space character, and (2) a carriage return character or a new line character.

17. The article of manufacture of claim 12, wherein the text messaging protocol is Short Message Service (SMS).

18. The article of manufacture of claim 12, wherein a first instance of a pattern of one or more transparent characters constitutes a first field delimiter and a second instance of the pattern of one or more transparent characters constitutes a second field delimiter.

19. The article of manufacture of claim 12, wherein the two or more transparent text message characters, one of (1) comprise a space character or a non-breaking space character followed by a carriage return, (2) are three space characters or non-breaking space characters followed by a carriage return, or (3) are three space characters or non-breaking space characters.

20. The article of manufacture of claim 12, wherein the two or more transparent text message characters comprise recognizable character patterns that signify 3 or more different types of data fields.

21. A mobile device, comprising:

a conversion engine to receive an indication to send a plurality of fields of business card data via a text messaging protocol to a second mobile device, to detect the plurality of fields, and to markup the data to create marked up data by: (1) adding at least three different length patterns of at least three different combinations of two or more transparent text message characters to delimit at least three different types of data fields of the plurality of fields in the data, wherein at least two of the two or more transparent text message characters are different characters, and (2) using a first instance of a first length pattern of a first two or more transparent text message characters to distinguish a first type of a data field; then using a second instance of the first length pattern of the first two or more transparent text message characters to distinguish a second type of a data field;

a transmitter to transmit the marked up data as a first text message via the text messaging protocol to the second mobile device; and the conversion engine further to receive a second text message, recognize transparent text message characters as field delimiters for data in the text message, and convert data in the text message into an electronic business card based at least in part on the field delimiters.

22. The mobile device of claim 21, further comprising a display screen to display an accentuated portion of the data with the data in the second text message, wherein a user-selection of the accentuated portion causes the electronic business card in the second text message to be displayed.

23. The mobile device of claim 22, wherein the accentuated portion is accentuated based on one or more of highlighting, displaying an image, or including an icon.

24. The mobile device of claim 22, wherein the text messaging protocol is Short Message Service (SMS).

25. The mobile device of claim 21, wherein the data comprises data selected from the group consisting of address data, phone number data, fax number data, email address data, name data, employer data, or web address data.

26. The mobile device of claim 21, wherein the transparent text messaging characters are one of Unicode characters or Global System for Mobile communications (GSM) characters.

27. The mobile device of claim 21, wherein the two or more transparent text messaging characters include (1) a space character or a non-breaking space character, and (2) a carriage return character or a new line character.

28. The mobile device of claim 21, wherein the text messaging protocol includes business card file format having the plurality of fields.

29. The mobile device of claim 21, wherein the two or more transparent text message characters, one of (1) comprise a space character or a non-breaking space character followed by a carriage return, (2) are three space characters or non-breaking space characters followed by a carriage return, or (3) are three space characters or non-breaking space characters.

30. The mobile device of claim 21, wherein the two or more transparent text message characters comprise recognizable character patterns that signify 3 or more different types of data fields.

31. A method, comprising:
receiving at a first mobile device an indication to send data having a personal or contact information via a text messaging protocol to a second mobile device;
detecting the personal or contact information;
automatically marking up the data to create marked up data by (1) adding at least three different length patterns of at least three different combinations of two or more transparent text message characters to delimit at least three different types of data fields associated with the personal or contact information in the data, wherein at least two of the two or more transparent text message characters are different characters;
and (2) using a first instance of a first length pattern of a first two or more transparent text message characters to distinguish a first type of a data field; then
using a second instance of the first length pattern of the first two or more transparent text message characters to distinguish a second type of a data field; and
transmitting the marked up data via the text messaging protocol to the second mobile device.

32. The method of claim 31, wherein the text messaging protocol includes business card file format.

33. The method of claim 31, wherein the two or more transparent text message characters, one of (1) comprise a space character or a non-breaking space character followed by a carriage return, (2) are three space characters or non-breaking space characters followed by a carriage return, or (3) are three space characters or non-breaking space characters.

34. The method of claim 31, wherein the two or more transparent text message characters comprise recognizable character patterns that signify 3 or more different types of data fields.

* * * * *